Oct. 20, 1970          G. J. YEVICK ET AL          3,535,015
DUAL-CAPACITY OPTICAL SYSTEMS
Filed Aug. 22, 1967
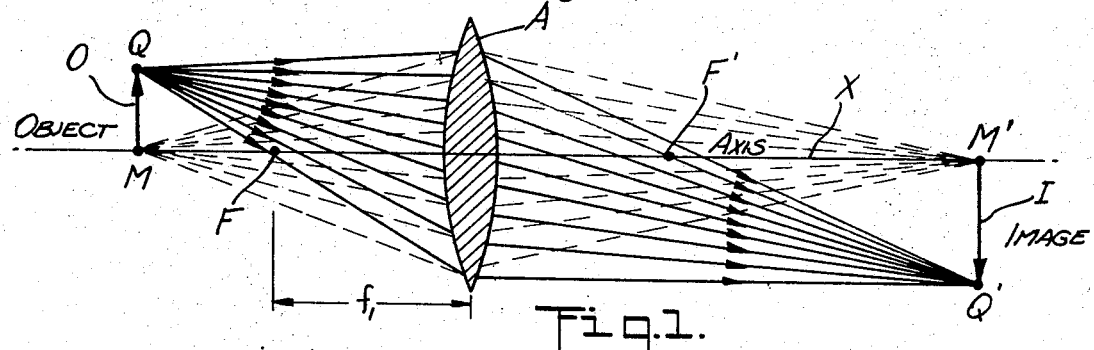
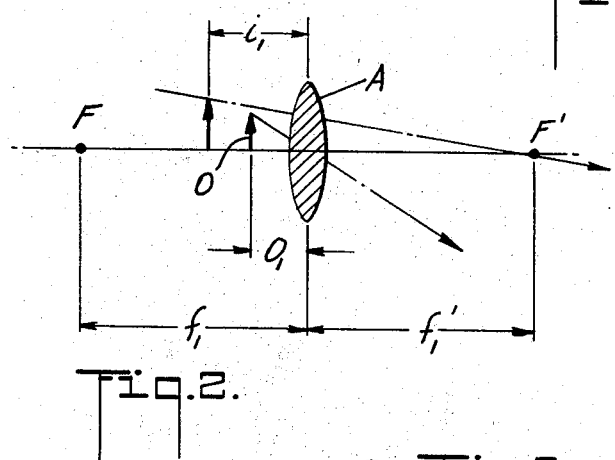
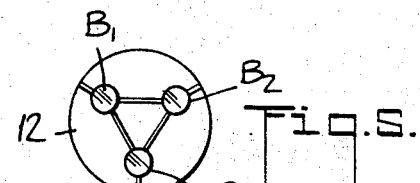
Fig.5.
Fig.6.
Fig.7.
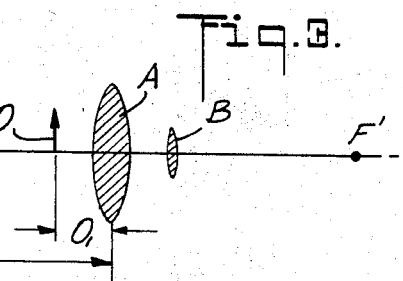
Fig.3.
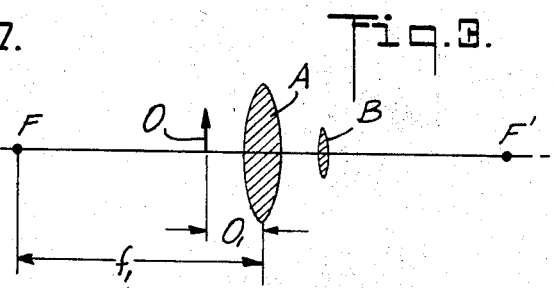
Fig.4.
INVENTORS
GEORGE J. YEVICK
LOUIS GOLD
BY
ATTORNEY

United States Patent Office 3,535,015
Patented Oct. 20, 1970

3,535,015
DUAL-CAPACITY OPTICAL SYSTEMS
George J. Yevick and Louis Gold, both of
536 Nordhoff Drive, Leonia, N.J. 07605
Filed Aug. 22, 1967, Ser. No. 662,403
Int. Cl. G02b 21/00, 23/00
U.S. Cl. 350—18                               8 Claims

ABSTRACT OF THE DISCLOSURE

A dual-capacity optical system adapted to function either as a microscope or as a telescope as well as with a camera to produce focused images of near and far objects, the system including both long-focus and short-focus objectives to produce a real image of a nearby or a remote object, which real image is magnified by a viewing or eyepiece lens, the two objectives being separately or concurrently operative without interference therebetween.

This invention relates generally to optical instruments, and in particular to a dual-capacity lens system capable of producing an image of a distant object or of a nearby object, whereby the system is adapted to function either as a microscope or as a telescope, the system being also adapted to serve as a camera lens in which focused images of remote and adjacent objects are simultaneously produced.

In its most elementary form, a microscope consists of two lenses, one of which is of very short focal length and is designated the objective. The other lens is of somewhat longer focal length and is called the ocular or eyepiece. While the two lenses may actually contain several optical elements to reduce abberations, their principal functions are as follows:

The object to be studied by the microscope is located just beyond the primary focal point of the objective, thereby forming a real image on the opposite side thereof. This real image becomes the object for the eyepiece, which functions as a magnifier and forms a large virtual image at a distance in advance of the objective. The virtual image becomes the object for the eye itself, which forms the final real image on the retina. Because of the very short focal length of the objective, a conventional microscope is incapable of seeing remote objects and cannot function as a telescope.

In the refracting telescope, the lens system is essentially the same as in the microscope, save that the objective has a long focal length. Rays from a distant object enter the objective and are brought to a focus at a point intermediate the objective and the eyepiece to form a real image. This real image becomes the object for the eyepiece which functions as a magnifier and is positioned relative to the objective so as to form a large virtual image at infinity. This virtual image becomes the object for the eye itself, the final image being formed on the retina. The diameter of the objective lens determines its light-gathering power, but large diameters are important only when little light is available. The conventional telescope is incapable of seeing objects directly adjacent thereto.

Binoculars are in reality a pair of identical telescopes mounted side by side. In the prism binocular, the first prism reinverts the image, and the second prism turns it left to right to give the image its proper position. The doubling-back of the light rays by the prisms has the further advantage of enabling longer-focus objectives to be used in short tubes, with consequent higher magnification. Though for reasons of simplicity the invention will be described herein in connection with a single telescope-microscope lens system, it is to be understood that its principles are equally applicable to binoculars and other paired lens systems.

The fundamental principle of a camera is that of a positive lens forming a real image. Sharp images of objects are formed on a photographic film or plate. The image size for a distant object is directly proportional to the focal length of the lens. Conventional cameras are capable of being focused on distant objects or on those which are close up, as a consequence of which when a nearby object is in focus, objects remote therefrom are necessarily out of focus. Hence in a photograph which encompasses both nearby and far objects, one or the other will be out of focus, depending on how the lens system had been adjusted.

There are many situations requiring the use of both telescopic and microscopic lens systems. Thus in nature study, one needs a telescope to view distant objects, and a microscope or magnifier to study objects in detail. Similarly, geophysical surveyors need telescopic lenses to make distant observations and microscopic lenses to study findings. But at present these requirements can only be satisfied by separate instruments.

Accordingly, it is the main object of this invention to provide a lens system capable of functioning without modification in a dual capacity to view either distant or adjacent objects, or to view both objects simultaneously.

More specifically, it is an object of the invention to provide an optical instrument using a lens system of the above-described type which is capable of functioning effectively as a microscope or as a telescope.

Also an object of the invention is to provide a lens system of the above-described type in conjunction with a camera to produce sharply focused moving or still images of both far and nearby objects, thus making it possible for the first time to produce clear close-ups while maintaining a background in focus.

Yet another object of the invention is to provide a dual-capacity optical instrument of the above type whose quality in either capacity is comparable to the best individual instruments presently available. Yet the cost of the dual-capacity instrument is only slightly greater than that of a single-capacity telescope of substantially the same quality. Thus, for a price not materially higher than that of a good-quality telescope or binoculars, the owner also has available a first-rate microscope. Because of its combined functions, the dual-capacity instrument conserves space, and where space is at a premium, as in military field equipment or in emergency kits, this advantage is of significant value.

Briefly stated, these objects are attained in an optical system constituted by a long-focal length objective and an eyepiece lens operating in conjunction therewith to provide image of distant objects, a second short-focal length objective being disposed adjacent the first objective and functioning in conjunction with the same eyepiece to provide images of nearby objects, the arrangement being such that the first objective, even though interposed in the optical path of the nearby-object system, in no way interferes therewith, and the second objective even though interposed in the optical path of the distant-object system, in no way interferes therewith.

For a better understanding of the invention, as well as other objects and further features thereof, reference is made to the following detailed description to be read in conjunction with the accompanying drawing, wherein:

FIG. 1 is a diagram illustrative of the operation of a conventional convex lens;

FIG. 2 schematically illustrates the operation of a telescope objective;

FIG. 3 schematically illustrates a dual-capacity objective in accordance with the invention;

FIG. 4 illustrates a telescope-microscope instrument in accordance with the invention;

FIG. 5 is a sketch of a selective lens microscope objective turret usable in the instrument shown in FIG. 4;

FIG. 6 shows in perspective a special cap to be used in conjunction with an instrument including said turret; and FIG. 7 is a camera including a lens system in accordance with the invention.

Before considering the optical principles underlying the invention, let us first review some elementary factors which come into play in a convex lens.

In FIG. 1, there is illustrated a convex lens A whose optical axis X is a straight line passing through the geometric center of the lens, the line joining the centers of curvature of the two surfaces. The primary focal point F is the axial point having the property that any ray coming from it or proceeding toward it travels parallel to the axis X, after refraction. The distance $f_1$ between focal point F and the lens center is the focal length. The secondary focal point F' is an axial point having the property that any incident ray travelling parallel to the axis will, after refraction, proceed toward or appear to come from point F'. If the lens in this example is a thin convex, focal points F and F' are equi-distant from the center of the lens.

Now if we place an object O on one side of lens A beyond focal point F, a real image I will be formed on the opposite side of the lens. Ideally, all rays coming from upper point Q in object O are brought to a focus at Q', while all rays from lower point M in object O are brought to a focus at M', thus inverting the image.

If object O moves closer to the primary focal point F, the image will be formed farther away from the secondary focal point F' and will be larger, i.e., magnified, but if object O moves farther away from primary focal point F, the image will be formed closer to F' and hence be smaller in scale.

In the behavior of the convex lens considered in connection with FIG. 1, we have confined ourselves to an object always beyond primary focal point F. Now in connection with FIG. 2, let us assume lens A to be a telescope objective having a long focal length $f_1$ and let us place the object O, not beyond focal point F, as is necessary to produce a real image to be seen by the eyepiece, but at a point between focal point F and the center of the lens, which point has a small distance $O_1$ from the lens center. To determine where the image I will now appear, the following equation is applicable:

(Eq. 1) $$\frac{1}{O_1}+\frac{1}{i_1}=\frac{1}{f_1}$$

where $i_1$ is the distance of the image from the center of the lens.

Solving for distance $i_1$, we have:

(Eq. 2) $$i_1 = -O_1 \left( \frac{1}{1-\frac{O_1}{f_1}} \right)$$

Since we are dealing with a telescopic objective in which $f_1$ is quite large, and $O_1$ is very small, the term $O_1/f_1$ when subtracted from 1 in Equation 2 gives a value only slightly less than 1. Hence image distance $i_1$ is substantially equal to object distance $O_1$ and being negative virtually coincides therewith.

If therefore, we now place, as shown in FIG. 3, a microscope objective B having a very short-focal length, behind the telescope objective and adjacent thereto, in order to view the object O which is close to the telescope objective A, the image formed of this object by the telescope objective is cast practically where microscope objective B is located. Consequently, telescope objective A acts essentially as a flat glass plate or window, so far as microscope objective B is concerned, and the focal length of the lens system constituted by the objectives A and B is therefore not significantly different from that of the objective B alone. In other words, the microscope objective effectively looks through the telescope objective and its presence does not interfere with or distort the observation of close objects.

When using objective lens A in a telescope, the object viewed by the eyepiece is a virtual image formed at infinity, the final image being formed on the eye. Even though in this instance a microscope objective B lies between objective A and the eyepiece, it is not visible to the eye. In fact, while a reduction in the aperture of the telescope objective causes a slight decrease in light-gathering power, as occurs also with a reduction in diameter of the objective, but without any loss in resolution, the presence of the microscope objective does no more than slightly reduce the light-gathering power of the telescope objective. This reduction ordinarily is imperceptible. For example, during daylight conditions it has been found by experience that one may blot out as much as two-thirds of the telescope objective without more than a small decrease in light intensity and without any noticeable loss of resolution to the viewer.

Thus, in the present invention, there is provided a dual-capacity instrument having both telescope and microscope objectives permanently in place and acting in conjunction with a common eyepiece, each functioning independently of the other without any material interference therebetween.

In the dual-capacity optical system shown in FIG. 4, eyepiece E is mounted at the end of tube 10, which adjustably telescopes within a larger tube or barrel 11, having a telescope objective A mounted at the end thereof, as well as a microscope objective B closely adjacent thereto. The microscope objective B need not be centered on the optical axis X of the telescope objective, but may be displaced therefrom, for it is encompassed within the field of view of the eyepiece. The structure of the telescope shown in FIG. 4 may be entirely conventional and include standard vernier controls, the only difference being the presence of the microscope objective therein.

The ray paths are illustrated only in conjunction with telescope objective A, rays from one point on a distant object entering the long-focus objective A as parallel beams and being brought to a focus to form a point image at Q'. Assuming the distant object to be an upright arrow, the image I is real and inverted as shown in FIG. 4. The real image is made to coincide with the focal point of both lenses, with the result that the image rays leave eyepiece E as a parallel bundle and the virtual image V is at infinity. The final image is always the one formed on the retina R of the eye by rays which appear to have come from point Q'' in the virtual image.

In FIG. 4, $f_o$ is the focal length of the objective A, and $f_e$ is the focal length of the eyepiece E, while the object being viewed subtends an angle $\theta$ at the objective, and $\theta'$ is the angle subtended at the eye by the final image. For the reasons explained previously, the presence of objective B in the optical system at a distance from the objective A, which is but a small fraction of the focal length $f_o$, has no effect whatever on its operation as a telescope, except to the extent that it slightly reduces its light-gathering power.

When the object being observed is very close to the instrument at a distance substantially less than the focal length of objective A, the latter acts merely as a window to admit rays to the microscope objective B. In this instance, the object will be located just outside of the focal point of objective B so as to form a real magnified image I which becomes the object for eyepiece E, which in turn forms a large virtual image at a distance beyond the object being viewed. This virtual image becomes the object for the eye itself, which forms the final image on the retina.

When using the instrument as a microscope, a masking cap is preferably placed over the end of tube 11, with an aperture therein which exposes only the microscope objective. In practice, it is also possible to provide a multiple-power microscope by mounting two or three different objectives on a turret disposed in tube 11. This turret, as shown in FIG. 5, may consist of a spider 12 arranged to support three microscopic objective lenses $B_1$, $B_2$, $B_3$, of different power, say 40, 120 and 360, which may be indexed with respect to a fixed aperture 14 on the cap 15, as shown in FIG. 5. Alternatively, the lenses $B_1$, $B_2$ and $B_3$ may be stationary whereas cap 15 is made rotatable for registration with a selected lens.

The dual-capacity device may also include a slit (not shown) in tube 11 to admit a specimen slide at a position interposed between the microscope and telescope objectives. Alternatively, the slide may be placed in front of the telescope objective.

It will be appreciated that a standard binocular having a pair of telescopes may be converted to a dual-capacity instrument, by inserting a microscopic objective in one of two lens systems adjacent the objective. In this instance, the binocular will be provided with the usual safety caps for the objectives, but one of the caps will include an aperture for use with the lens also having a microscope function.

The lens system in accordance with the invention is also applicable to a camera. FIG. 7 shows a camera for taking still pictures, the camera including an adjustable bellows 16, a film 17, and the usual shutter mechanism (not shown). In lieu of the standard lens system, the camera includes a dual-capacity lens system of the type previously disclosed, except that instead of an eyepiece, the lens C is a positive camera lens to produce a sharp image on the film. The long-focus objective D is comparable to the special type of objective used in a telephoto lens to produce an image of a remote object, while the short-focus lens G is adapted to produce an image of a nearby object.

Since the short-focus lens does not interfere with the action of the long-focus lens despite its physical proximity in the optical path, it becomes possible, with proper adjustment of the optics, to cast onto film 17 sharply-focused images both of nearby and remote objects. Thus one may photograph a person close to the camera, while the remote background is also in focus. The same system may be used to advantage in motion-picture cameras.

While there have been shown and described preferred embodiments of a dual-capacity optical system in accordance with the invention, it will be appreciated that many changes and modifications may be made therein without, however, departing from the essential spirit of the invention as defined in the annexed claims.

What I claim is:
1. An optical system for viewing nearby and distant objects comprising:
   (a) a first objective having a relatively long focal length for viewing distant objects;
   (b) a magnifying lens adjustably positioned with respect to said first objective for viewing the real image produced by said first objective;
   (c) a second objective having a short focal length; and
   (d) spider means mounting said second objective behind said first objective without substantially decreasing the amount of light gathered by said objective in viewing said distant objects and producing said real image of said distant objects,
      (1) said spider means mounting said second objective at a fixed distance from said first objective for cooperation with said magnifying lens in viewing nearby objects,
      (2) said fixed distance being a small fraction of the focal length of said first objective.

2. A system as set forth in claim 1, wherein said magnifying lens is an eyepiece of a telescope, said first objective is a telescope lens, and said second objective is a microscope lens.

3. A system as set forth in claim 1, further including a masking cap to cover said first objective and including an aperture to expose only said second objective.

4. A system as set forth in claim 1, wherein said second objective is selected from a group thereof of different power, said spider means including an adjustable turret to place the selected objective into operative relation with the eyepiece.

5. A system as set forth in claim 1, wherein said system is combined with a camera to produce focused images of nearby and far objects on a sensitized surface.

6. A system as set forth in claim 1, wherein the diameter of said second objective is much smaller than the diameter of said first objective.

7. A system as set forth in claim 6, wherein said first and second objectives jointly constitute a lens system having a focal length not substantially different from the focal length of said second objective.

8. A system as set forth in claim 7, wherein said first objective has an optical axis, and said second objective is radially spaced from said axis.

References Cited

UNITED STATES PATENTS

| | | | |
|---|---|---|---|
| 533,325 | 1/1895 | Stevens | 350—18 |
| 1,553,211 | 9/1925 | Barr et al. | 350—39 X |
| 3,064,526 | 11/1962 | Lindsay | 350—46 X |
| 3,227,035 | 1/1956 | Maillard | 350—316 |
| 910,344 | 1/1909 | Young | 350—37 |

FOREIGN PATENTS

| | | |
|---|---|---|
| 27,572 | 9/1904 | Great Britain. |

PAUL R. GILLIAM, Primary Examiner

U.S. Cl. X.R.

350—19, 37, 39